(12) United States Patent
Frolov

(10) Patent No.: US 9,352,403 B2
(45) Date of Patent: May 31, 2016

(54) DUAL STAGE DRIVE FOR POWER EQUIPMENT

(71) Applicants: Robert Bosch Tool Corporation, Broadview, IL (US); Robert Bosch GmbH

(72) Inventor: Andrew Frolov, Glenview, IL (US)

(73) Assignee: Robert Bosch GmbH, Stuttgart (DE)

( * ) Notice: Subject to any disclaimer, the term of this patent is extended or adjusted under 35 U.S.C. 154(b) by 164 days.

(21) Appl. No.: 14/099,711

(22) Filed: Dec. 6, 2013

(65) Prior Publication Data

US 2014/0157966 A1 Jun. 12, 2014

Related U.S. Application Data

(60) Provisional application No. 61/735,975, filed on Dec. 11, 2012.

(51) Int. Cl.
*B23D 47/12* (2006.01)
*B23D 47/02* (2006.01)
*B23D 45/06* (2006.01)

(52) U.S. Cl.
CPC .............. *B23D 47/123* (2013.01); *B23D 45/06* (2013.01); *B23D 47/025* (2013.01); *B23D 47/12* (2013.01); *Y10T 83/773* (2015.04); *Y10T 83/7722* (2015.04)

(58) Field of Classification Search
CPC ........ B23D 45/06; B23D 7/025; B23D 47/12; B23D 47/123; Y10T 83/773; Y10T 83/7722
USPC .............. 83/477, 477.2, 698.11, 543, 698.41, 83/62.1, 76, 74, 591, 665, 666, 67, 5, 438, 83/435.1, 437; 144/286, 285, 287, 286.1, 144/286.5
See application file for complete search history.

(56) References Cited

U.S. PATENT DOCUMENTS

| 2,905,211 | A | | 9/1959 | Weinstein | |
|---|---|---|---|---|---|
| 4,018,118 | A | * | 4/1977 | Goff | ................................. 83/167 |
| 4,252,239 | A | * | 2/1981 | Snyder | .......................... 206/349 |

(Continued)

FOREIGN PATENT DOCUMENTS

DE 202006001808 U1 7/2007
EP 0258136 A1 3/1988

(Continued)

OTHER PUBLICATIONS

Bosch 4100 User Manual (Bosch4100manual.pdf).

(Continued)

*Primary Examiner* — Ghassem Alie
(74) *Attorney, Agent, or Firm* — Maginot Moore & Beck LLP

(57) ABSTRACT

A power equipment includes a base defining an enclosure space, a table supported on the base, and a cutting assembly supported within the enclosure space below the table. The cutting assembly includes a motor having an output shaft and a dual stage drive system operably coupled to the output shaft. The output shaft defines a first axis of rotation. The dual stage drive system includes two drive stages which enable the motor of the drive system to be moved farther inward, away from the table top, which provides clearance for the incorporation of other features into and immediately below the table top.

6 Claims, 4 Drawing Sheets

(56) References Cited

U.S. PATENT DOCUMENTS

| | | | |
|---|---|---|---|
| 4,408,509 A * | 10/1983 | Winchip | 83/435.27 |
| 4,694,721 A * | 9/1987 | Brickner, Jr. | 83/471.3 |
| 4,771,667 A * | 9/1988 | Forman et al. | 83/100 |
| 5,201,863 A * | 4/1993 | Peot | B23D 47/025 83/432 |
| 5,720,213 A * | 2/1998 | Sberveglieri | B23D 45/062 83/471.3 |
| 6,067,884 A | 5/2000 | Naldi | |
| 6,330,848 B1 * | 12/2001 | Nishio et al. | 83/62.1 |
| 6,971,298 B2 * | 12/2005 | Ushiwata et al. | 83/581 |
| 7,231,856 B2 * | 6/2007 | Gass et al. | 83/58 |
| 7,395,745 B2 * | 7/2008 | Gehret et al. | 83/471.3 |
| 8,418,591 B2 * | 4/2013 | Frolov | 83/477.2 |
| 2001/0032534 A1 | 10/2001 | Ceroll et al. | |
| 2003/0213349 A1 * | 11/2003 | Chang | 83/438 |
| 2005/0000339 A1 | 1/2005 | Chang | |
| 2005/0160895 A1 | 7/2005 | Garcia et al. | |
| 2005/0247177 A1 | 11/2005 | Hetcher et al. | |
| 2005/0262983 A1 | 12/2005 | Hetcher et al. | |
| 2010/0050843 A1 | 3/2010 | Gass et al. | |
| 2010/0058909 A1 | 3/2010 | Chen | |
| 2011/0056084 A1 * | 3/2011 | Okada et al. | 30/376 |

FOREIGN PATENT DOCUMENTS

| | | |
|---|---|---|
| EP | 1008410 A1 | 6/2000 |
| EP | 2486998 A2 | 8/2012 |

OTHER PUBLICATIONS

Bosch GTS1031 User Manual (BoschGTS1031manual.pdf).
DeWalt 745 User Manual (DeWalt745manual.pdf).
Hitachi C10RB Parts Diagram (HitachiC10RBPartsDiagram.pdf).
Makita 2704 User Manual (Makita2704manual.pdf).
International Search Report and Written Opinion corresponding to PCT Application No. PCT/US2013/073763, mailed Apr. 4, 2014 (11 pages).

* cited by examiner

DUAL STAGE DRIVE FOR POWER EQUIPMENT

CROSS-REFERENCE TO RELATED APPLICATIONS

This application claims priority to U.S. Provisional Application Ser. No. 61/735,975 entitled "DUAL STAGE DRIVE FOR POWER EQUIPMENT" by Andrew Frolov et al., filed Dec. 11, 2012, the disclosure of which is hereby incorporated herein by reference in its entirety.

TECHNICAL FIELD

This disclosure relates to power equipment, and particularly drive systems for driving the cutting blade of a power equipment.

BACKGROUND

Table mounted cutting tools, such as table saws, are valuable tools used for a variety of tasks, such as cross-cutting wood, and ripping large boards or panels into narrow strips. While there are a variety of table saw designs, most table saws include a base housing structure that supports a table top and a cutting assembly positioned below the table top. The table top has a substantially planar upper surface upon which workpieces may be supported.

The cutting assembly includes a circular saw blade that is mounted on an arbor with a portion of the blade extending upwardly through an opening defined in the table top. The cutting assembly also includes a motor with power train for rotating the arbor so that the cutting blade may be driven to perform cutting operations on workpieces supported on the table top. As the motor drives the cutting blade to rotate, a workpiece may be moved across the table top against the blade to allow the blade to perform cuts on the workpiece.

Traditional table saws typically utilize a single stage gear or belt drive system for coupling the drive motion of the motor to the arbor of the cutting blade, which is sufficient for most applications. However, utilizing a single stage gear or belt drive system often requires that the motor be positioned very close to the table top to provide adequate vertical cutting capacity for the blade as depicted in FIG. 4 (dimension b). The close positioning of the motor in relation to the table top leaves little to no room for other features to be incorporated into or below the table top.

DRAWINGS

DESCRIPTION

Figure 1:
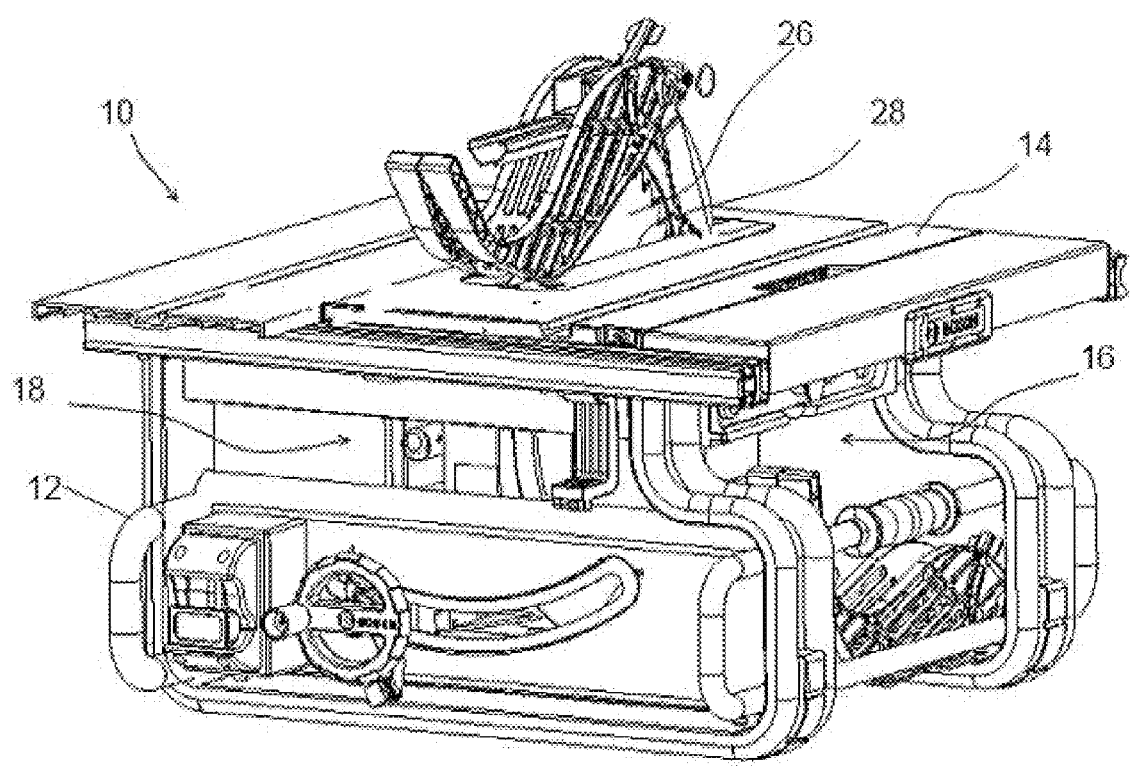
FIG. 1 depicts a perspective view of one embodiment of a power equipment.

For the purposes of promoting an understanding of the principles of the disclosure, reference will now be made to the embodiments illustrated in the drawings and described in the following written specification. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

The present disclosure is directed to a dual stage drive system for a power equipment. In one embodiment, the power equipment includes a base defining an enclosure space, a table supported on the base above the enclosure space and including a blade opening, and a cutting assembly supported within the enclosure space below the table. The cutting assembly includes a motor having an output shaft, a dual stage drive system operably coupled to the output shaft, and an arbor operably coupled to the dual stage drive system. The arbor is configured to retain a cutting blade with the cutting blade extending upwardly from the enclosure space through the blade opening in the table. The output shaft defines a first axis of rotation. The dual stage drive system includes a first pinion mounted on the output shaft for rotation about the first axis. A first gear is positioned in meshing engagement with the first pinion and mounted on a first shaft that defines a second axis of rotation that is substantially parallel to the first axis and offset from the first axis. A second pinion is mounted on the first shaft for rotation about the second axis. A second gear is positioned in meshing engagement with the second pinion, the second gear being mounted on a second shaft, the second shaft defining a third axis of rotation that is substantially parallel to the second axis and being positioned such that the third axis is offset from the first axis and the second axis. The arbor is connected to the second shaft for rotation about the third axis along with the second shaft.

In another embodiment, the power equipment includes a base defining an enclosure space, a table supported on the base above the enclosure space and including a blade opening, and a cutting assembly supported within the enclosure space below the table. The cutting assembly includes a motor having an output shaft, a dual stage drive system operably coupled to the output shaft, and an arbor operably coupled to the dual stage drive system. The arbor is configured to retain a cutting blade with the cutting blade extending upwardly from the enclosure space through the blade opening in the table. The output shaft defines a first axis of rotation. The dual stage drive system includes a first gear mounted on a first shaft. The first shaft defines a second axis of rotation that is substantially parallel to the first axis and is positioned such that the second axis is offset from the first axis. A pinion gear is mounted on the first shaft for rotation about the second axis, and a second gear is positioned in meshing engagement with the second pinion. The second gear is mounted on a second shaft that defines a third axis of rotation that is substantially parallel to the second axis and positioned such that the third axis is offset from the first axis and the second axis. A belt is wound around the output shaft and the first shaft for driving the first shaft about the second axis in response to the output shaft being driven about the first axis. The arbor is connected to the second shaft for rotation about the third axis along with the second shaft.

The power equipment may be any equipment having a saw blade and capable of penetrating into workpieces, such as wood, including a table saw, bevel saw, miter saw, shop saw, band saw, jig saw, circular saw, chain saw, planer, joiner, etc. The dual stage drive system includes two drive stages which enable the motor of the drive system to be moved farther inward, away from the table top, which provides clearance for the incorporation of other features into and immediately below the table top. Offsetting the motor from the arbor of the cutting blade also allows the arbor of the saw blade to be positioned closer to table top to maximize the vertical cutting capacity of the blade. Offsetting the motor from the table top also enables negative bevel angles.

Figure 2:
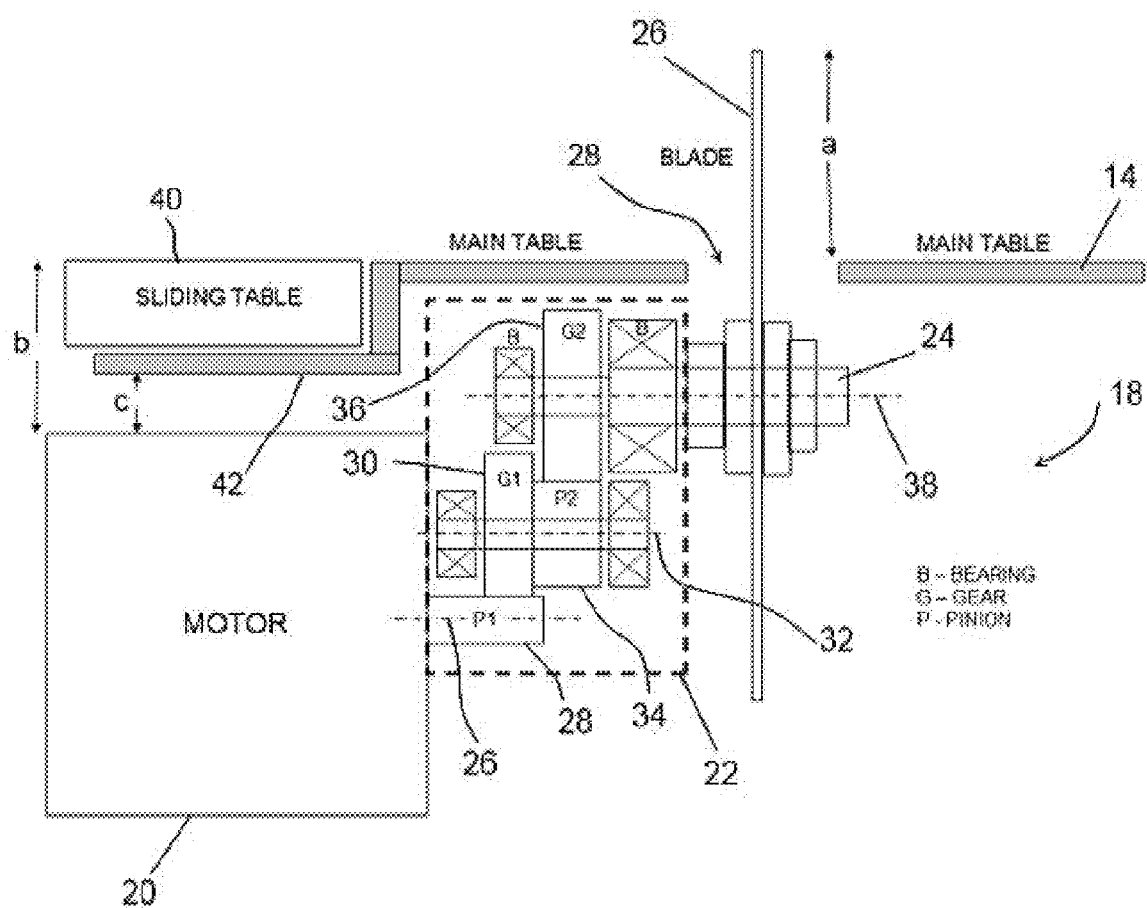
FIG. 2 depicts a schematic view of a dual gear drive system for use in the power equipment of FIG. 1.

FIGS. 1 and 2 depict an exemplary embodiment of a power equipment 10 including a dual stage drive system in accordance with the present disclosure. As depicted in FIG. 1, the power equipment is a table saw assembly 10 and includes a base frame 12, a main table 14, and a cutting assembly 16. The base frame 12 defines an enclosure space 18 where the components of the cutting assembly 16, such as the motor 20 (FIG. 2), dual stage drive system 22 (FIG. 2), arbor 24 (FIG. 2), and circular saw blade 26 are mounted. The main table 14 is supported on the base frame 12 above the cutting assembly 16 and includes a generally planar upper surface that serves as a workpiece support surface. The circular saw blade 26 of the cutting assembly 16 extends upwardly through a blade opening 28 defined in the main table 14.

Referring now to FIG. 2, an embodiment of the dual stage drive system for cutting assembly 16 of the table saw assembly of FIG. 1 is shown. As depicted in FIG. 2, the drive system includes a motor 20, a gear housing 22, an arbor 24, and a circular saw blade 26. The motor 20 comprises an electric motor and includes an output shaft with a pinion 28 mounted thereon the shaft. The motor 20 is configured to drive the output shaft P1 to rotate about a first axis 26, or motor axis.

The gear housing 22 houses a dual gear drive in accordance with one embodiment of the present disclosure. The dual gear drive includes a first pinion 28 that is configured to be driven to rotate about the first axis 26 as the motor output shaft. The first pinion 28 is in turn meshed with a first gear 30, which may comprise a spur gear or similar type of gear. The first gear 30 is supported by a first shaft for rotation about a second axis 32 that is parallel to and offset from the first axis 26. As can be seen in FIG. 2, the second axis 32 is offset from the first axis 26 aside or toward the main table 14.

The shaft of the first gear 30 may be supported at each end by bearings as depicted in FIG. 2. A second pinion 34 is attached to the shaft or to the first gear 30 for rotation with the first gear about the second axis 32. The second pinion 34 is in turn meshed with a second gear 36 (e.g., a spur gear). The second gear 36 is supported by a second shaft for rotation about a third axis 38 that is offset from the motor axis 26 and the first axis 32. As can be seen in FIG. 2, the third axis 38 is offset from the second axis 32 aside or toward the main table 14.

The second shaft is supported in bearings for rotation about the third axis 38. The third axis 38 also corresponds to the axis of rotation of the arbor 24 and the circular saw blade 26. The second shaft is aligned axially with the arbor 24 and is connected to the arbor 24 in a manner that enables the arbor 24 to be driven to rotate about the third axis 38 along with the second shaft by the second gear 36. In use, the motor 20 drives the first pinion 28 to rotate about the first axis 26 which in turn causes the first gear 30 to rotate about the second axis 32. Rotation of the first gear 30 about the second axis 32 causes the second pinion 34 to rotate which in turn causes the second gear 36 to rotate about the third axis 38. The second gear 36 rotates the second shaft which causes the arbor 24 and the saw blade 26 to be rotated about the third axis 38.

Figure 4:
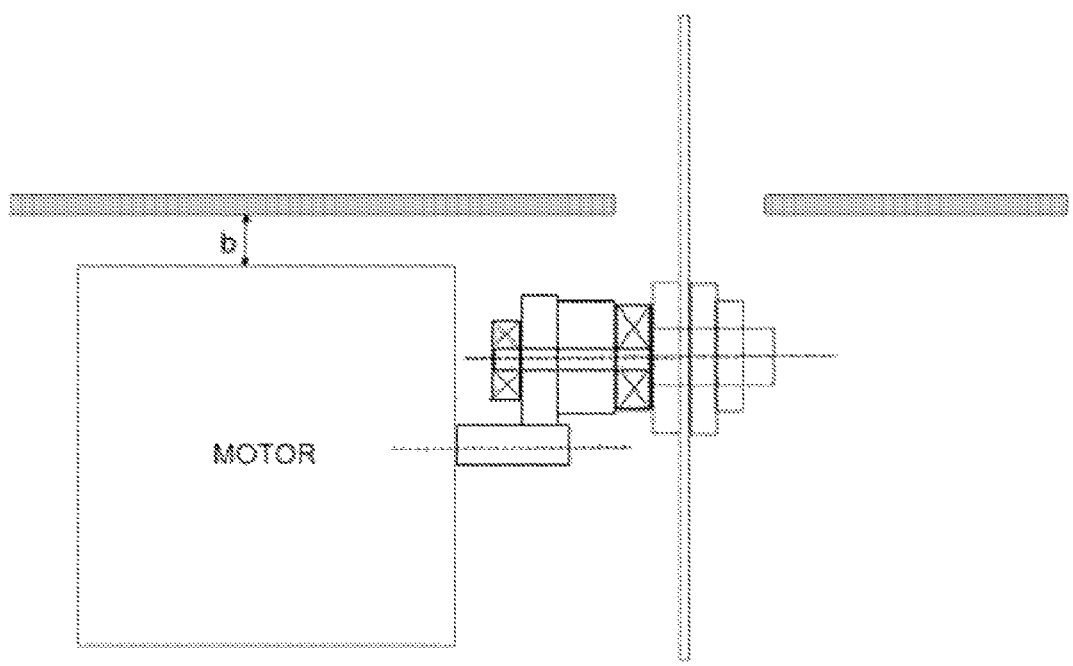
FIG. 4 depicts a schematic view of a prior art single stage drive system for a power equipment.

The use of the dual gear drive enables the motor 20 to be offset farther below the main table than would possible with a single stage drive, such as depicted in FIG. 4. Increasing the distance (dimension b in FIG. 2) between the motor 20 and the main table 14 allows other features to be incorporated into the main table, such as a sliding table 40, as depicted in FIG. 2. The sliding table 40 is configured to slide outwardly from the main table 14 in order to extend the support surface so that larger workpieces can be supported on extension table surface by fixed miter fence and to be moved toward blade for cross cut with higher accuracy than if supported by the main table.

The upper surface of the sliding table 40 needs to be arranged substantially in plane with the upper surface of the main table 14 so as not to alter the angle of the workpiece in relation to the blade and also to allow smooth movement of workpieces across the surface of the main table. To allow the upper surface of the sliding table 40 to be positioned in plane with the upper surface of the main table, the sliding table support 42 and mounting structures must be recessed below the main table 14.

By utilizing the dual gear drive system of FIG. 2, the motor 20 can be offset a suitable distance (dimension b) from the main table 14 to provide clearance (dimension c) for the mounting components 42 and the lower body of the sliding table 40 to be recessed below main table 14. The dual gear drive also allows the motor 20 to be more offset from the arbor 24. Further, the dual gear drive has smaller gears outside diameter for the same gear ratio. This enables the arbor 24 to be moved closer to the main table in order to maximize the vertical extension (dimension a) of the blade 26 through the opening in the main table.

Figure 3:
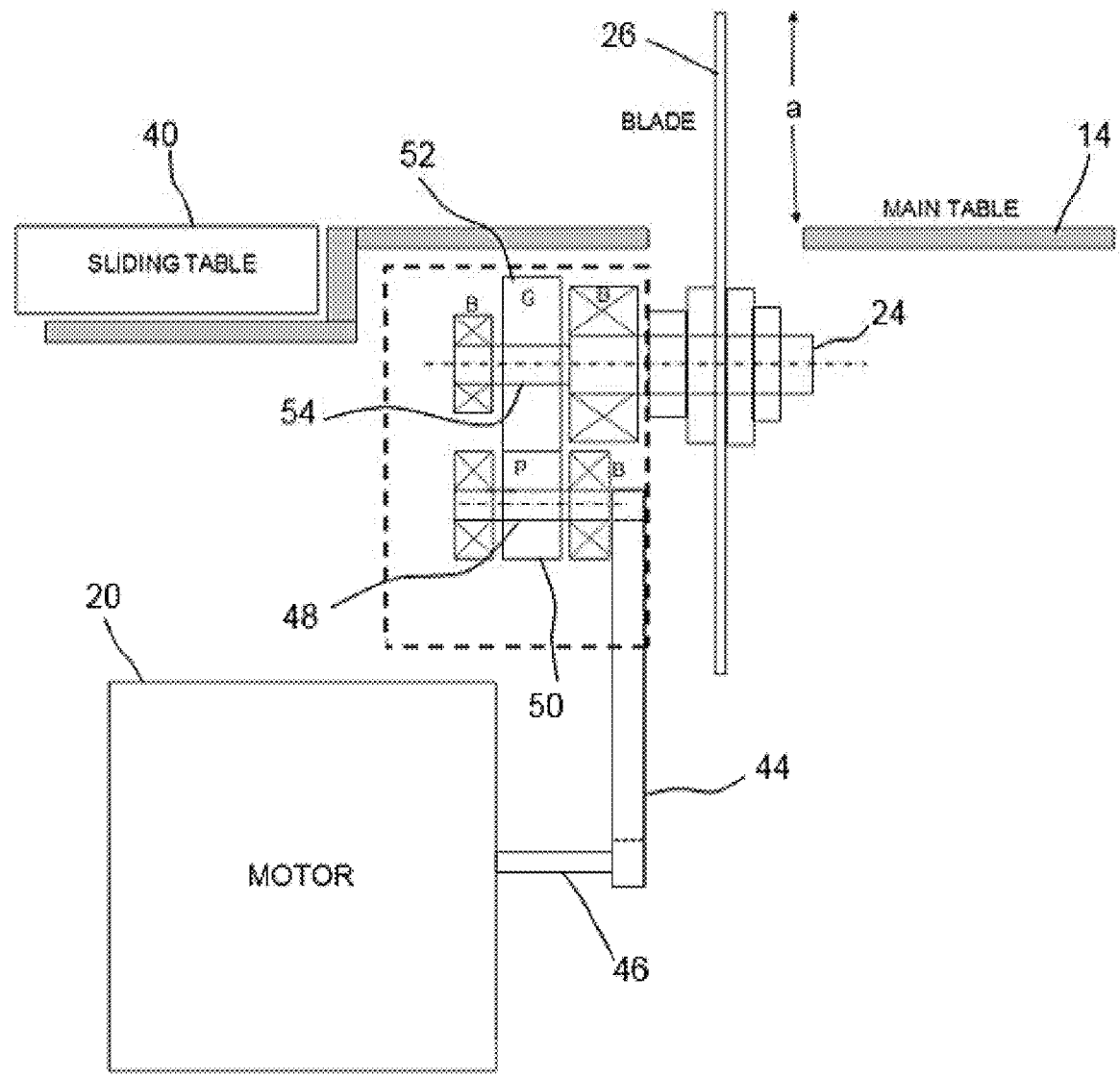
FIG. 3 depicts a schematic view of a belt/gear dual drive system for use in a power equipment such as depicted in FIG. 1.

As an alternative to the dual gear drive system of FIG. 2, a belt/gear dual drive system may be utilized as depicted in FIG. 3. The belt/gear dual drive system includes a belt 44 that is looped around the output pulley mounted on a shaft 46 of the motor 20 at one end and looped around a pulley mounted on a shaft 48 at the other end. A pinion 50 on the pinion shaft 48 is meshed with a gear 52. The gear 52 is supported on a shaft 54 that is connected to the arbor 24. The belt/gear dual drive of FIG. 3 enables the motor 20 to be offset a significant distance below the main table 14 and even to be positioned below the gears and/or the blade if desired. The dual belt/gear drive also has smaller gears outside diameter for the same gear ratio. This enables the arbor 24 to be moved closer to the main table in order to maximize the vertical extension (dimension a) of the blade 26 through the opening in the main table similar to the dual gear system of FIG. 2.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

What is claimed is:

1. A table power equipment comprising:
   a table saw having:
   a base defining an enclosure space;
   a table supported on the base above the enclosure space and including a support surface and a blade opening; and
   a cutting assembly supported within the enclosure space below the table, the cutting assembly including a motor having an output shaft, a dual stage drive system operably coupled to the output shaft, and an arbor operably coupled to the dual stage drive system, the arbor being configured to retain a cutting blade with the cutting blade extending upwardly from the enclosure space through the blade opening in the table,
   wherein the output shaft defines a first axis of rotation,
   wherein the dual stage drive system includes:
   a first pinion mounted on the output shaft for rotation about the first axis,
   a first gear positioned in meshing engagement with the first pinion, the first gear being mounted on a first shaft, the first shaft defining a second axis of rotation that is substantially parallel to the first axis and being positioned such that the second axis is offset from the first axis, a second pinion mounted on the first shaft for rotation about the second axis, and a second gear positioned in meshing engagement with the second pinion, the second gear being mounted on a second shaft, the second shaft defining a third axis of rotation that is substantially parallel to the second axis and being positioned such that the third axis is offset from the first axis and the second axis, wherein the arbor is connected to the second shaft for rotation about the third axis along with the second shaft, wherein the table includes a sliding table extension positioned at least one side of the blade opening and above the enclosure, the sliding table extension including a sliding table member having an upper surface and a sliding table support that slidably supports the sliding table member, the sliding table support being offset below a bottom surface of the table to position the sliding table member with the upper surface aligned with the support surface, and wherein the motor is positioned at least partially under the sliding table support within the enclosure.

2. The power equipment of claim 1, wherein the first shaft is offset below the second shaft, and wherein the motor is positioned with the output shaft offset below the first shaft.

3. The power equipment of claim 2, wherein the motor includes a housing from which the output shaft extends, the housing having an upper surface that is located a first distance above the output shaft, and wherein the output shaft, the first shaft, and the second shaft are positioned with respect to each other such that the upper surface of housing is located a second distance from a bottom surface of the table, the second distance being greater than the first distance by an amount that enables the motor to be operably supported below the bottom surface of the table.

4. The power equipment of claim 3, wherein the first shaft is positioned a third distance below the bottom surface of the table, and wherein the third distance is less than the second distance.

5. The power equipment of claim 4, wherein the bottom surface is located a fourth distance below the bottom surface of the table, and wherein the second distance is greater than the fourth distance.

6. The power equipment of claim 5, wherein the first shaft and the second shaft are each supported at each end by bearings.

* * * * *